US008078588B2

(12) United States Patent
Lakshminath et al.

(10) Patent No.: US 8,078,588 B2
(45) Date of Patent: Dec. 13, 2011

(54) RECOVERABLE EXECUTION

(75) Inventors: Anand Lakshminath, Fremont, CA (US); Lik Wong, Union City, CA (US); James Stamos, Saratoga, CA (US); Alan Downing, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 11/247,973

(22) Filed: Oct. 10, 2005

(65) Prior Publication Data

US 2007/0083530 A1     Apr. 12, 2007

(51) Int. Cl.
*G06F 7/00* (2006.01)
*G06F 17/00* (2006.01)

(52) U.S. Cl. ........ 707/675; 707/682; 707/683; 707/684; 707/703

(58) Field of Classification Search .......... 707/202, 707/200, 607, 609, 610, 674, 675, 678, 682, 707/683, 684, 703
See application file for complete search history.

(56) References Cited

U.S. PATENT DOCUMENTS

| | | | | |
|---|---|---|---|---|
| 4,945,474 | A | * | 7/1990 | Elliott et al. ............ 714/16 |
| 6,012,094 | A | * | 1/2000 | Leymann et al. ......... 709/230 |
| 6,185,577 | B1 | * | 2/2001 | Nainani et al. .......... 707/202 |
| 6,668,304 | B1 | * | 12/2003 | Satran et al. ............ 711/112 |
| 6,898,608 | B2 | | 5/2005 | Hopeman et al. |
| 6,961,865 | B1 | | 11/2005 | Ganesh et al. |
| 6,983,295 | B1 | * | 1/2006 | Hart ..................... 707/204 |
| 7,310,711 | B2 | * | 12/2007 | New et al. ............... 711/154 |
| 2002/0049776 | A1 | * | 4/2002 | Aronoff et al. ........... 707/200 |
| 2002/0133507 | A1 | * | 9/2002 | Holenstein et al. ....... 707/200 |
| 2003/0061398 | A1 | * | 3/2003 | Wilson et al. ............ 709/318 |
| 2003/0191782 | A1 | * | 10/2003 | Buxton et al. ........... 707/202 |
| 2003/0204534 | A1 | | 10/2003 | Hopeman et al. |
| 2005/0050056 | A1 | | 3/2005 | Idicula et al. |
| 2005/0050105 | A1 | | 3/2005 | Idicula et al. |
| 2006/0004882 | A1 | | 1/2006 | Itikarlapalli et al. |

OTHER PUBLICATIONS

Al-Houmaily, Y. J., "*1-2 PC: the One-Two Phase Atomic Commit Protocol*", Proceedings of the 2004 ACM Symposium on Applied Computing, Mar. 2004, pp. 684-691, Nicosia, Cyprus.

Alonso, G. et al.; "*Reducing Recovery Constraints on Locking Based Protocols*", Proceedings of the Thirteenth ACM SIGACT-SIGMOD-SIGART Symposium on Principles of Database Systems, May 1994, pp. 129-138, ACM Press, USA.

Barga, R. et al., "*Recovery Guarantees for Internet Applications*", ACM Transactions on Internet Technology, Aug. 2004, pp. 289-328, ACM Press, USA.

Beeri, C., "*A Concurrency Control Theory for Nested Transactions (Preliminary Report)*", Proceedings of the Second Annual ACM Symposium on Principles of Distributed Computing PODC '83, Aug. 1983, pp. 45-62, ACM Press USA.

(Continued)

*Primary Examiner* — Marc Somers
(74) *Attorney, Agent, or Firm* — Vista IP Law Group, LLP

(57) ABSTRACT

Systems and methods for providing a one-step API that executes a series of atomic transactions in a database system. In one implementation, each atomic transaction is associated with a forward block of code that effects changes, an undo block of code that reverses the changes made by the forward block, and a state block of code that mimics successful execution of the forward block by setting internal states. In the event of a failure, the forward blocks, undo blocks, and state blocks can be used to roll forward or roll back changes as a whole. In one implementation, a one-step API for replicating data in a database is provided.

31 Claims, 10 Drawing Sheets

OTHER PUBLICATIONS

Bernstein P. et al., "*An Algorithm for Concurrency Control and Recovery in Replicated Distributed Databases*", ACM Transactions on Database Systems, Dec. 1984, vol. 9, No. 4, pp. 596-615, ACM Press, USA.

Chang, Jo-Mei, "*Simplifying Distributed Database Systems Design by Using a Broadcast Network*", Proceedings of the 1984 ACM SIGMOD International Conference on Management of Data, vol. 14, Issue 2, Jun. 1984, pp. 223-233, ACM Press USA.

Choy, M., "*Disaster Recovery Techniques for Database Systems*", Communications of the ACM, 2000, pp. 272-280, ACM Press USA.

Daniels, D., "*Distributed Logging for Transaction Processing*", ACM SIGMOD Record, Proceedings of the 1987 ACM SIGMOD International Conference on Management of Data SIGMOD '87, vol. 16, No. 3, Dec. 1987, pp. 82-96, ACM Press USA.

Goodman, N. et al., "*A Recovery Algorithm for a Distributed Database System*", Proceedings of the $2^{nd}$ ACM SIGACT-SIGMOD Symposium on Principles of Database Systems, 1983, pp. 8-15, ACM Press, USA.

Gray, J. et al., "*The Recovery Manager of the System R Database Manager*", ACM Computing Surveys, vol. 13, No. 2, Jun. 1981, pp. 223-242, ACM Press USA.

Haerder, T. et al., "*Principles of Transaction-Oriented Database Recovery*", ACM Computing Surveys, vol. 15, No. 4, Dec. 1983, pp. 287-317, ACM Press USA.

Haskin, R. et al., "*Recovery Management in QuickSilver*", ACM Transactions on Computer Systems, vol. 6, No. 1, Feb. 1988, pp. 82-108, ACM Press USA.

Herlihy, M., "*Concurrency and Availability as Dual Properties of Replicated Atomic Data*", Journal of the Association for Computing Machinery, vol. 37, No. 2, Apr. 1990, pp. 257-278, New York, USA.

Jaluta, I. et al., "*Concurrency Control and Recovery for Balanced B-link Trees*", The VLDB Journal—The International Journal on Very Large Data Bases, Apr. 2005, vol. 14, No. 2, pp. 257-277, Springer-Verlag New York, Inc. USA.

Keen, J. et al., "*Extended Ephemeral Logging: Log Storage Management for Applications with Long-Lived Transactions*", ACM Transactions on Database Systems, vol. 22, No. 1, Mar. 1997, pp. 1-42, ACM Press USA.

Kohler, W., "*A Survey of techniques for Synchronization and Recovery in Decentralized Computer Systems*", Computing Surveys, vol. 13, No. 2, Jun. 1981, pp. 149-183, ACM Press USA.

Kolodner, E., et al., "*Atomic Garbage Collection: Managing a Stable Heap*", Proceedings of the 1989 ACM SIGMOD Internatinal Conference on Management of Data, vol. 18, No. 2, Jun. 1989, pp. 15-25, ACM Press USA.

Kolodner, E. et al., "*Atomic Incremental Garbage Collection and Recovery for a Large Stable Heap*", Proceedings of the 1993 ACM SIGMOD International Conference on Management of Data, 1993, pp. 177-186, ACM Press USA.

Lee, S., et al., "*A New Conflict Relation for Concurrency Control and Recovery in Object-based Databases*", Proceedings of the Fifth International Conference on Information and Knowledge Management, 1996, pp. 288-295, ACM Press USA.

Lomet, D. et al., "*Access Method Concurrency With Recovery*", Proceedings of the 1992 ACM SIGMOD International Conference on Management of Data SIGMOD '92 , vol. 21, No. 2, Jun. 1992, pp. 351-360, ACM Press USA.

Lomet, D., et al., "*Concurrency and Recovery for Index Trees*", The VLDB Journal—The International Journal on Very Large Data Bases, vol. 6, No. 3, Aug. 1997, pp. 224-240, Springer-Verlag New York Inc. USA.

Lomet, D., et al., "*Efficient Transparent Application Recovery In Client-Server Information Systems*", ACM SIGMOD Record, Proceedings of the 1998 ACM SIGMOD International Conference on Management of Data SIBMOD '98, vol. 27. No. 2, Jun. 1998, pp. 460-471, ACM Press USA.

Lomet, D. et al., "*Logical Logging to Extend Recovery to New Domains*", Proceedings of the 1999 ACM SIGMOD International Conference on Management of Data, Jun. 1999, pp. 73-84, ACM Press USA.

Lomet, D., et al., "*MLR: A Recovery Method for Multi-level Systems*", ACM SIGMOD Record, Proceedings of the 1992 ACM SIGMOD International Conference on Management of Data SIGMOD '92, vol. 21, No. 2, Jun. 1992, ACM Press USA.

Mohan, C. et al., "*ARIES: A Transaction Recovery Method Supporting Fine-Granularity Locking and Partial Rollbacks Using Write-Ahead Logging*", ACM Transactions on Database Systems, vol. 17, No. 1, Mar. 1992, pp. 94-162, ACM Press USA.

Mohan, C., "*Methods for Distributed Transaction Commit and Recovery Using Byzantine Agreement Within Clusters of Processors*", IBM San Jose Research Laboratory, 1983, pp. 89-98, ACM Press USA.

Mohan, C. et al., "*Transaction Management in the R\* Distributed Database Management System*", ACM Transactions on Database Systems, vol. 11. No. 4, Dec. 1986, pp. 378-396, ACM Press USA.

Moss, J. et al., "*Abstraction in Recovery Management*", Department of Computer and Information Science, University of Massachusetts, and School of Information and Computer Science, Georgia Institute of Technology, 1986, pp. 72-83, ACM Press USA.

Nodine, M., "*Cooperative Transaction Hierarchies: Transaction Support for Design Applications*", VLDB Journal—The International Journal of Very Large Data Bases, vol. 1, pp. 41-80, 1992, Springer-Verlag New York Inc. USA.

Oki, B., "*Reliable Object Storage to Support Atomic Actions*", ACM SIGOPS Operating Systems Review, Proceedings of the Tenth ACM Symposium on Operating Systems Principles SOSP '85, vol. 19, No. 5, Dec. 1985, pp. 147159, ACM Press USA.

Ong, K., "*Session 3: Synapse Approach to Database Recovery*", Proceedings of the $3^{rd}$ ACM SIGACT-SIGMOD Symposium on Principles of Database Systems, Apr. 1984, pp. 79-85, ACM Press USA.

Reuter, A., "*Performance Analysis of Recovery Techniques*", ACM Transactions on Database Systems, vol. 9, No. 4, Dec. 1984, pp. 526-559, ACM Press USA.

Roy, P., "*Garbage Collection in Object-Oriented Databases Using Transactional Cyclic Reference Counting*", The VLDB Journal 1998, vol. 7, pp. 179-193, Springer-Verlag Press USA.

Spector, A., "*Distributed Transactions for Reliable Systems*", Department of Computer Science, Carnegie-Mellon University, 1985, pp. 127-146, ACM Press USA.

Spector, A., "*Transactions: A Construct for Reliable Distributed Computing*", ACM SIGOPS Operating Systems Review, vol. 17, No. 2, Apr. 1983, pp. 18-35, ACM Press USA.

Svobodova, L., "*File Servers for Network-Based Distributed Systems*", ACM Computing Surveys, vol. 16, No. 4, Dec. 1984, pp. 353-398, ACM Press USA.

Varakantham, P. et al, "*On Handling Component and Transaction Failures in Multi Agent Systems*", ACM SIGecom Exchanges, vol. 3, No. 1, Dec. 2001, ACM Press USA.

Verhofstad, J., "*Recovery Techniques for Database Systems*", ACM Computing Surveys, vol. 10, No. 2, Jun. 1978, pp. 166-195, ACM Press USA.

Weihi, W., "*Linguistic Support for Atomic Data Types*", ACM Transactions on Programming Languages and Systems, vol. 12, No. 2, Apr. 1990, pp. 178-202, ACM Press USA.

Weihl, W., "*Implementation of Resilient, Atomic Data Types*", ACM Transactions on Programming Languages and Systems, vol. 7, No. 2, Apr. 1985, pp. 244-269, ACM Press USA.

Weikum, G., "*Multi-Level Recovery*", Proceedings of the Ninth ACM SIGACT-SIGMOD-SIGART Symposium on Principles of Database Systems, Apr. 1990, pp. 109-123, ACM Press USA.

Weikum, G., "*Multi-Level Transaction Management for Complex Objects: Implementation, Performance, Parallelism*", VLDB Journal—The International Journal on Very Large Data Bases, vol. 2, No. 4, Oct. 1993, pp. 407-453, 1993, Springer-Verlag New York, Inc. USA.

Weikum, G., "*Principles and Realization Strategies of Multilevel Transaction Management*", ACM Transactions on Database Systems, vol. 16, No. 1, Mar. 1991, pp. 132-180, ACM Press USA.

White, S. J. et al., "*Implementing Crash Recovery in QuickStore: A Performance Study*", Proceedings of the 1995 ACM SIGMOD International Conference on Management of Data, May 1995, vol. 24, No. 2, pp. 187-198, ACM Press USA.

Reed, D.P. "Implementing Atomic Actions on Decentralized Data" ACM Transactions on Computer Systems, Feb. 1983, vol. 1, No. 1, pp. 3-23.

\* cited by examiner

US 8,078,588 B2

RECOVERABLE EXECUTION

BACKGROUND AND SUMMARY

The invention relates to computer systems, and more particularly to a method and mechanism for providing recoverability for a set of atomic operations.

In database systems, a "transaction" normally refers to an atomic set of operations performed against a database. The transaction may access, create, modify, or delete database data or database metadata while it is being processed. A "commit" occurs when the transaction has completed its processing and any changes to the database by the transaction are ready to be permanently implemented in the database system. Because the transaction is atomic, all actions taken by the transaction must be committed at the same time. If any operation taken by the transaction cannot be performed, then the entire transaction must be aborted—not just the particular operation that failed. When the transaction is aborted, any changes made by that transaction to the database are "rolled back" such that the database is returned to its pre-existing state from immediately prior to the aborted transaction.

Transaction log records can be maintained to allow suitable recovery operations in the event of a system failure or aborted transaction. Some common problems that could cause a system failure or aborted transaction include hardware failure, network failure, process failure, database instance failure, data access conflicts, user errors, and statement failures in the database access programs (most often written in the structured query language or SQL).

Different types of transaction log records can be maintained in a database system. A common transaction logging strategy is to maintain "redo" records that log all changes made to the database. With "write ahead logging," each change to data is first recorded in the redo log, and only afterwards is that change actually made to the database block corresponding to the changed data. This protects against the situation when a system failure occurs and the version of the database data that is immediately restored from disk does not accurately reflect the most recent state of the database. This may occur because of changes to the data that have only occurred in cache, and have not been recorded to disk before the failure. If the redo log has been properly maintained for these cache-only changes, then recovery can be performed by applying the redo records to roll the database forward until it is consistent with the state that existed just before the system failure.

Another type of log record that may be maintained is the "undo" record, which can also be referred to as a "rollback" segment. Undo records contain information about database actions that should be undone during certain database operations. For example, if the rolling forward process during recovery has applied uncommitted changes to the database, then undo records can be applied to remove uncommitted changes, thereby ensuring that only committed changes exist in the database after recovery. In addition, if a transaction is aborted, then undo records can be applied to return the database to its pre-existing state from prior to the aborted transaction. If a database uses multi-versioning to allow different transactions to view database data from different points in time, then undo records can be used to create multiple versions of the database that are consistent with the different points in time.

In some cases, a particular series of atomic transactions may be used to perform actions in a database system. Each of these atomic transactions may generate and store transaction logs, such as a redo log and an undo log. Managing the plurality of transaction logs associated with each atomic transaction in a series of atomic transactions may prove difficult and cumbersome.

The present invention may therefore include systems and methods for grouping transaction logs. Grouping transaction logs may assist a user in managing the transaction logs associated with a series of atomic transactions.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

DETAILED DESCRIPTION

The present invention provides a method and mechanism for implementing transaction logs in a database system. For the purpose of explanation, throughout this document the term "disk" or "disk system" is used to refer to data storage systems, but the inventive concepts disclosed herein may also be applied to other types of storage systems besides disk-based systems. In addition, the following description will be made with respect to the storage/retrieval of relational data from a database. It is noted, however, that the present invention is applicable to managing other types and granularities of data in a computing system, and thus is not to be limited to management of just relational data. In particular, it is contemplated that the present invention may be used to replicate or otherwise manage text files, images, audio/video data, or other types of files and/or data.

One-Step Operations

One embodiment of the invention provides systems and methods for grouping a plurality of atomic transactions into a one-step operation. A series of atomic transactions may be executed to perform an operation or set of operations on data. Each of the atomic transactions may be associated with one or more transaction logs. In order to create a one-step operation from a plurality of atomic transactions, groupings of transaction logs may be created. The grouping of transaction logs may contain transaction logs sufficient to roll forward or roll back changes made by the series of atomic transactions.

In one implementation, the atomic transactions may be implemented, for example, as APIs in a database system, and the one-step operation may be implemented as a one-step API. In this implementation, the one-step API may execute a series of atomic transactions by making calls to the APIs for the atomic transactions. Because the APIs for the atomic transactions may be called by the one-step API, they may be referred to as "lower-level APIs." The transaction logs for the low-level APIs may be associated into grouping of transaction logs. The one-step API may include calls to roll forward or roll back changes made during execution. In order to roll forward or roll back changes, the one-step API may execute transaction logs in the grouping.

Figure 1A:
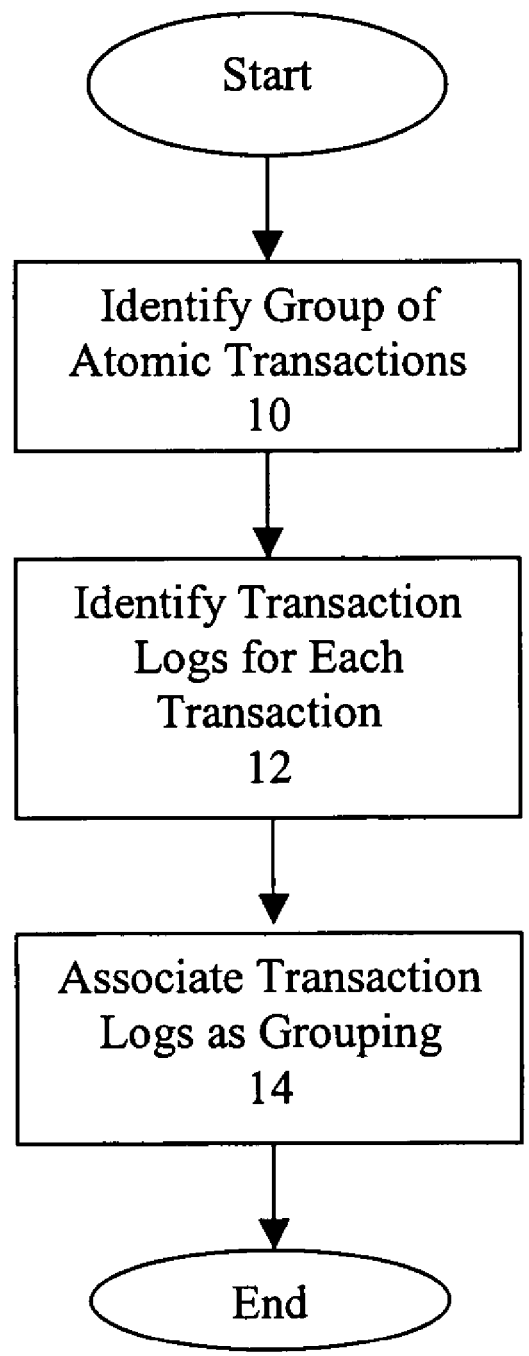
FIG. 1A is a flow chart depicting a method for grouping a plurality of atomic transactions, in accordance with an embodiment of the present invention.

FIG. 1A is a flow chart depicting a method for associating a plurality of atomic transactions. The method of FIG. 1A may be used, for example, to create a one-step operation from a plurality of atomic transactions. Each of the atomic transactions may commit separately upon successful completion, and each of the atomic transactions may generate a separate set of transactions logs. It may therefore prove difficult or cumbersome for a user to search through the transaction logs to locate and execute the appropriate logs. The method of FIG. 1A may be used to associate the logs for each atomic transaction, such that a user may quickly and easily execute a series of atomic transactions, or recover from a failure by rolling forward or rolling back changes to the data.

As shown in FIG. 1A, the method may begin in step 10, wherein a group of atomic transactions may be identified. The atomic transactions identified may be, for example, a series of atomic transactions that are to be grouped together to generate a one-step operation.

The method may continue in step 12, wherein transaction logs for each transaction may be identified. The transaction logs identified may include, for example, a redo log, an undo log, and a state log for each atomic transaction. The transaction logs will be described further below.

In step 14, the transaction logs may be associated into an atomic grouping. This includes, for example, associating the transaction logs such that any changes made to the data during the execution of the series of atomic transactions may be rolled forward or rolled back using transaction logs in the grouping. For example, if a failure occurs during the execution of the series of atomic transactions, changes to the data may be rolled forward or rolled back using transaction logs in the grouping. The groupings of transaction logs will be described further herein below.

Figure 1B:
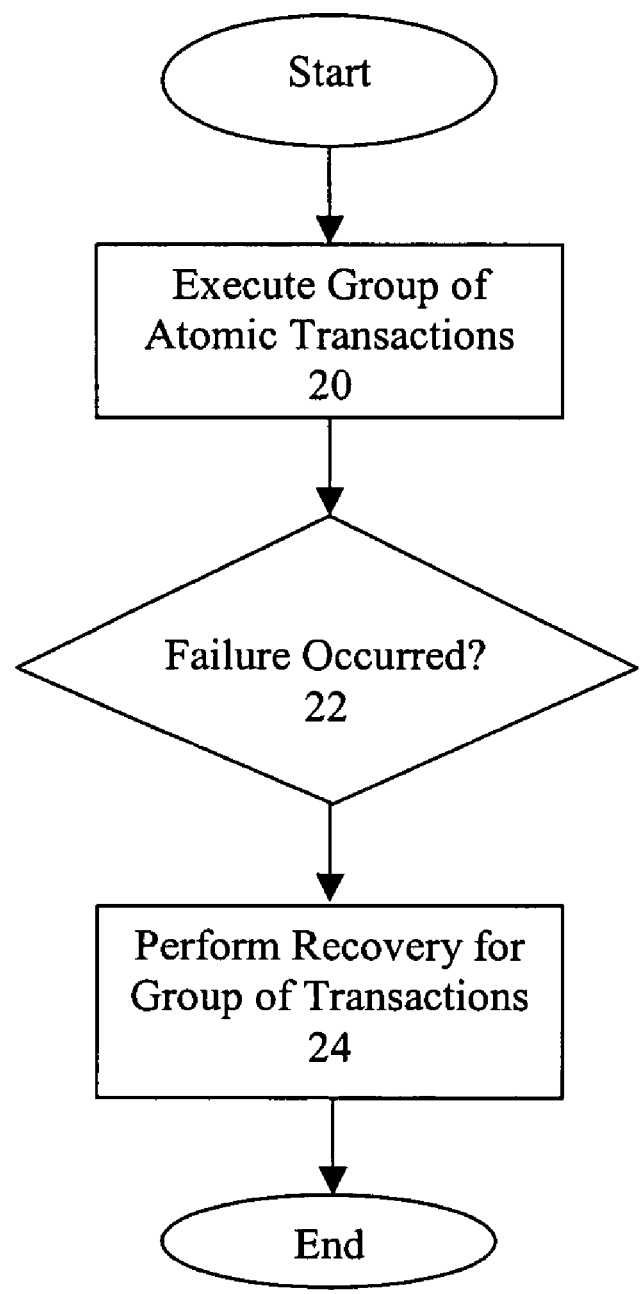
FIG. 1B is a flow chart depicting a method for executing a plurality of atomic transactions, in accordance with an embodiment of the present invention.

FIG. 1B is a flow chart depicting a method for executing a plurality of atomic transactions. The method of FIG. 1B may be used, for example, to enact changes to a database through a series of atomic transactions, and to perform recovery operations in case a failure occurs during execution of the series of atomic transactions.

As shown in FIG. 1B, the method may begin in step 20, wherein a group of atomic transactions may be executed. In step 22, it may be determined whether a failure occurred during the execution of the atomic transactions. If a failure occurred, recovery may be performed for the group of transactions in step 24. In one implementation, performing recovery for a group of transactions is performed using transaction logs in a grouping.

In order to form groupings of transaction logs, a system of recoverable operations may be used. A recoverable operation may be any operation that may be reversed to return the data to its original state. In one implementation, the one-step operation may itself be or include a recoverable operation, and each atomic transaction called by the one-step operation may also be associated with or include a recoverable operation.

A recoverable script may be or include code which is executed to roll a recoverable operation forward or back. In one implementation, each atomic transaction may be implemented as a recoverable operation, and a recoverable script may be generated and executed for each atomic transaction. The system of recoverable operations may allow the one-step operation to be rolled forward or rolled back as a whole.

A recoverable script may access one or more transaction logs to roll forward or roll back changes made to a database. In one implementation, a recoverable script associated with a one-step operation may access a plurality of transaction logs. These transaction logs may be the grouping of transaction logs formed for the one-step operation. The references to the transaction logs contained in the recoverable script may constitute the grouping of transaction logs.

Figure 1C:
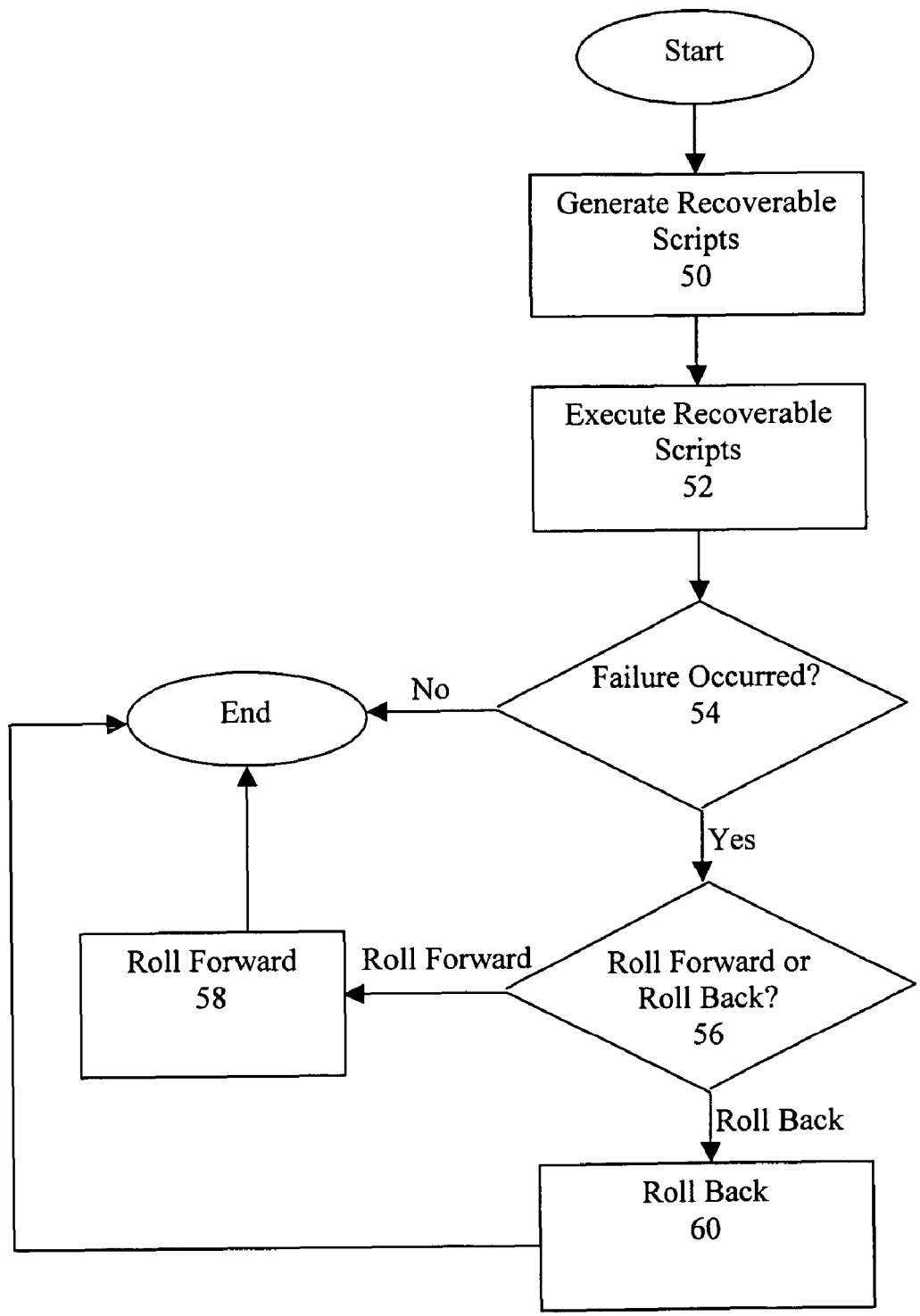
FIG. 1C is a flow chart illustrating a method for executing a one-step operation, in accordance with an embodiment of the present invention.

A method for executing a one-step operation is illustrated in FIG. 1C. As shown in FIG. 1C, the one-step operation may be implemented as a one-step API, and the atomic transactions may be implemented as lower-level APIs. However, the invention is not limited to this particular implementation.

As shown in FIG. 1C, the method may begin in step 50, wherein one or more recoverable scripts may be generated. Each recoverable script may be or include, for example, executable code describing a recoverable operation. A recoverable script may be generated for each lower-level API called by the one-step API. In one implementation, a recoverable script may also be generated for the one-step API. A method for generating recoverable scripts will be discussed further with reference to FIG. 3.

The recoverable scripts may contain references to one or more transaction logs. The references to the transaction logs contained in the recoverable scripts may constitute the grouping of transaction logs.

The method may continue in step 52, wherein the recoverable scripts may be executed. For example, the recoverable scripts corresponding to the lower-level APIs may be executed to call the lower-level APIs in sequence or to otherwise effect the changes described by the lower-level APIs. During execution of the recoverable scripts, one or more lower-level APIs may make changes to data and, upon successful completion, may commit these changes. A method for executing recoverable scripts will be discussed further with reference to FIG. 4.

In step 54, it may be determined whether a failure occurred. If no failure occurred, in some implementations, the one-step API may commit. The method may then terminate.

If a failure occurred, in step 56, it may be determined whether to roll forward or roll back. In one implementation, a user may be notified that a failure occurred, and the user may provide input specifying whether to roll forward or roll back. In another implementation, a user may specify in advance whether to roll forward or to roll back. In yet another implementation, it may be electronically determined whether to roll forward or to roll back.

If the changes are to be rolled forward, the changes are rolled forward in step 58. If the changes are to be rolled back, the changes are rolled back in step 60. Methods for rolling forward and rolling back will be discussed further with reference to FIGS. 5-6.

After rolling forward 58 or rolling back 60, the one-step API may commit, and the method may end.

Data Replication

The method for generating a one-step operation may be used for any series of atomic transactions. For example, the method may be used to generate a one-step operation for configuring data replication. This particular application of the invention will be described below, although those skilled in the art will recognize that many other applications are possible.

In database systems, data may be replicated from one database to another, or may be replicated within the same database. Replicating data may ensure, for example, that data remains consistent over multiple databases, or within the same database. Methods for configuring data replication may involve calling a series of atomic transactions that perform various functions involved in setting up data replication. Each atomic transaction may automatically perform a "commit" that makes any changes to the databases permanent.

The present invention may provide a single transaction that is capable of configuring replication from one database to another, or within a single database. In one implementation, this transaction may perform only one commit that makes changes to the database(s) permanent. In another implementation, this transaction may comprise several lower-level atomic transactions, each of which may perform a commit upon successful execution. In the latter case, the transaction may include mechanisms for rolling forward or rolling back all transactions made by the lower-level atomic transactions.

Figure 1D:
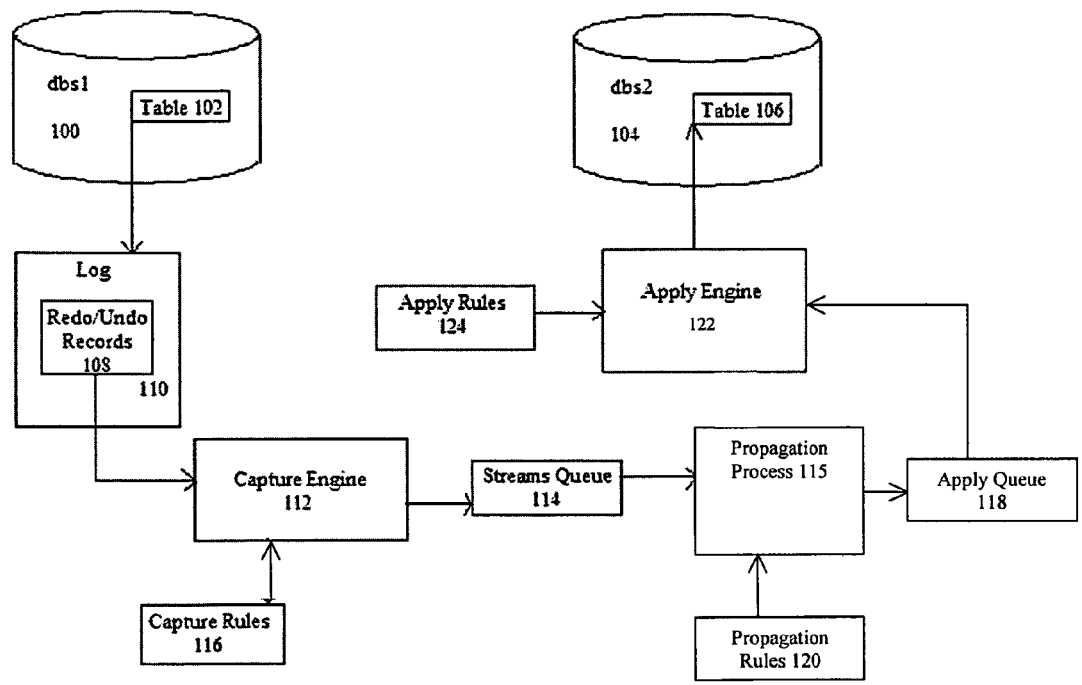
FIG. 1D is a block diagram illustrating a system in accordance with the present invention.

FIG. 1D shows a block diagram of a system that may be used in accordance with an embodiment of the present invention. As shown in FIG. 1D, data may be stored, for example, in a first database 100. The data may be stored within a table 102 within the database 100 or may be stored elsewhere. Data from the database 100 may be replicated, for example, to a second table 106 within a second database 104 or elsewhere. In replicating data from a first database 100 to a second database 104, any changes made to data in the first database 100 will be reflected in the second database 104. This replication ensures that data stored in the databases 100, 104 remains consistent.

In one implementation, tables 102 and 106 may be stored within the same database. In another implementation, data may be replicated from one file system to another, or from one memory block to another. Other implementations involving other types of data and other storage systems are possible.

When changes are made to data within the first database 100, the changes are also written to a log 110 in the form of redo records 108. The redo records 108 contain sufficient information to reenact the changes in the database 100 or to effect the changes in the database 104. In order to replicate the changes to the second database 104, a capture engine 112 retrieves redo records 108 from the redo log 110. In retrieving redo records 108, the capture engine 112 may apply one or more capture rules 116, which specify which redo records 108 to extract from the redo log 110. The capture rules 116 may be specified in advance by a user based on the changes that should be propagated to the second database 104. For example, a user may wish to replicate only specific types of data from the first database 100 to the second database 104. Alternatively, a user may wish to replicate all data from the first database 100 to the second database 104. The capture rules 116 may specify the particular subset of data that is to be replicated.

The capture engine 112 may then translate the retrieved redo records 108 into a logical format and places the logical representation of redo records 108 into a streams queue 114. A propagation process 115 may read from the streams queue 114 and from one or more propagation rules 120. The propagation rules 120 may specify, for example, what changes made in the first database 100 should be propagated in the second database 104. The propagation process 115 may apply the propagation rules 120 to the logical representation of the redo records that is stored in the streams queue 114, and place the result in an apply queue 118.

An apply engine 122 may use one or more apply rules 124 that specify how the redo records 108 should be applied to the second database 104. The apply engine 122 may then apply the redo records to the second database 104 to replicate the changes to the first database 100 in the second database 104.

In one particular implementation, a method for replicating data involves a series of calls made to lower-level APIs. Such a method is described further with reference to FIG. 2.

Figure 2:
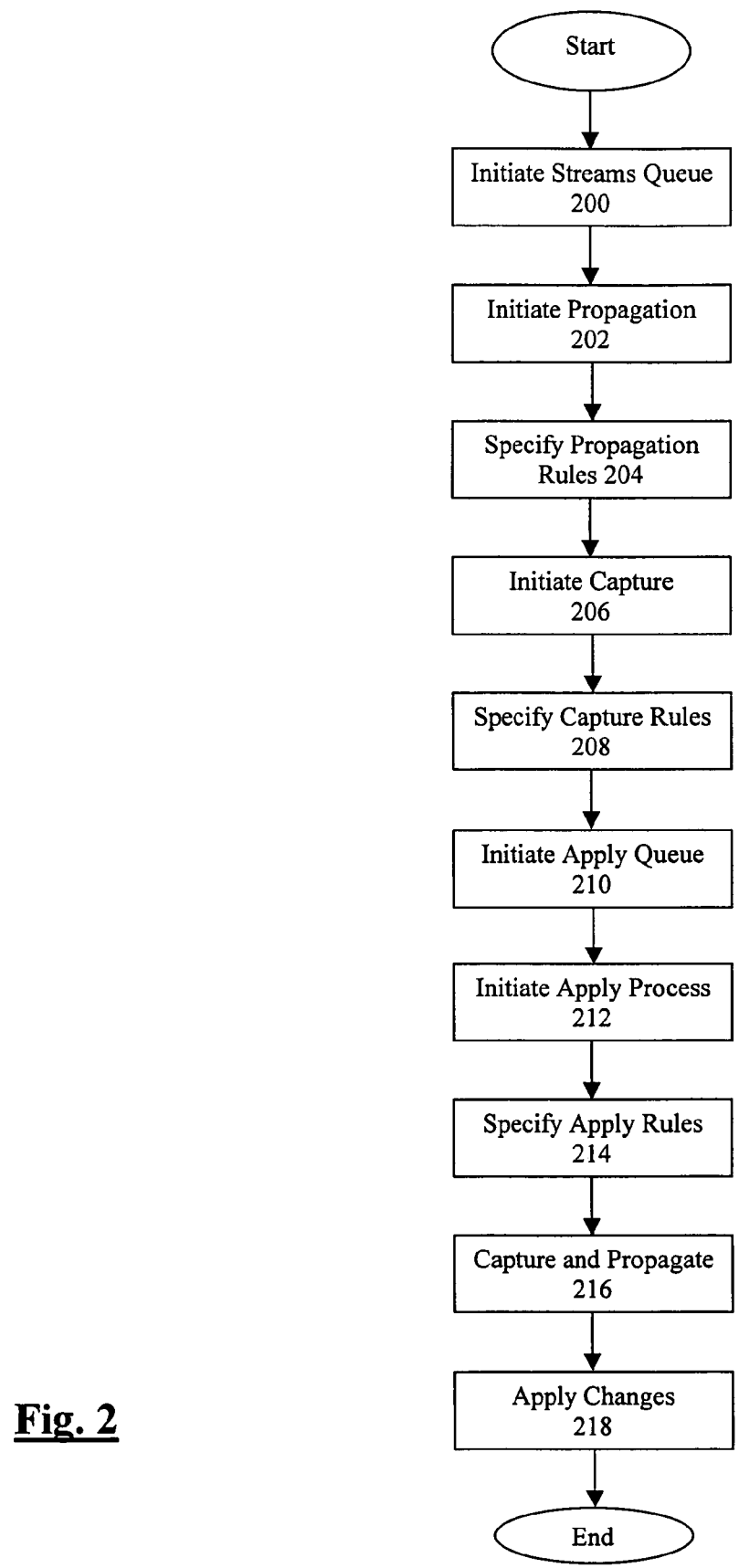
FIG. 2 is a flow chart illustrating a method for replicating data in a database.

As shown in FIG. 2, a method for configuring data replication may include a series of steps 200, 202, 204, 206, 208, 210, 212, 214, 216, 218. Each of the steps 200, 202, 204, 206, 208, 210, 212, 214, 216, 218 may be an atomic transaction. Furthermore, each of the steps 200, 202, 204, 206, 208, 210, 212, 214, 216, 218 may be implemented as a call to a lower-level API. Each call to a lower-level API may result in a separate commit upon successful completion.

In particular, a method for configuring replication from a first database to a second database may include initiating a streams queue 200 and initiating a propagation process 202. The method may further include specifying one or more propagation rules 204. Specifying one or more propagation rules 204 may include, for example, accepting user input and creating one or more propagation rules based on the user input. The method may further include initiating a capture process 206 and specifying one or more capture rules 208. Specifying one or more capture rules 208 may include, for example, examining the structure of the first database and the second database and creating one or more capture rules based on those structures.

Steps 200, 202, 204, 206, 208 may be implemented, for example, as calls to lower-level APIs, and may be executed within the first database.

The method may continue in step 210, wherein an apply queue may be initiated. In step 212, an apply process may be initiated. The method may further include specifying one or more apply rules 214. Specifying one or more apply rules 214 may include, for example, examining the structure of the second database and creating one or more apply rules based on that structure. In step 216, redo records may be captured and propagated at the first database. The method may continue in step 218, wherein changes may be applied to the second database.

Steps 210, 212, 214, and 218 may be implemented, for example, as calls to lower-level APIs, and may be executed within the second database. Step 216 may be implemented, for example, as a call to a lower-level API, and may be executed within the first database.

In one implementation, a one-step operation may be provided for data replication. This one-step operation may configure data replication, for example, by performing atomic transactions as illustrated in steps 200, 202, 204, 206, 208, 210, 212, 214, 216, 218. Each of the atomic transactions may commit separately upon successful execution. Thus, in the case of a failure, some of the changes involved in configuring data replication may be committed, while other changes may not yet be committed. In this case, it may be difficult and cumbersome for a database administrator or other user to determine which step caused the error and to recover from the error by rolling forward or rolling back the changes to the data.

To aid a user in recovering from such a failure, the one-step operation may use a system of recoverable operations, each associated with an atomic transaction.

Recoverable Operations

In order to aid a user in recovering from a failure, a one-step operation may use a system of recoverable operations. A recoverable operation is, for example, any operation that may be reversed to return the data to its original state. In one implementation, the one-step operation may itself be or include a recoverable operation, and may further make calls to one or more atomic transactions, each of which may also be or include a recoverable operation.

A recoverable script may be executable code describing a recoverable operation. Each recoverable script may include a set of "forward blocks" of code that may be executed to perform the recoverable operation, a set of "undo blocks" of code that may be executed to undo changes made to the data, and a set of "state blocks" of code that may be used to set the states of various variables to mimic successful completion of the recoverable operation.

Figure 3:
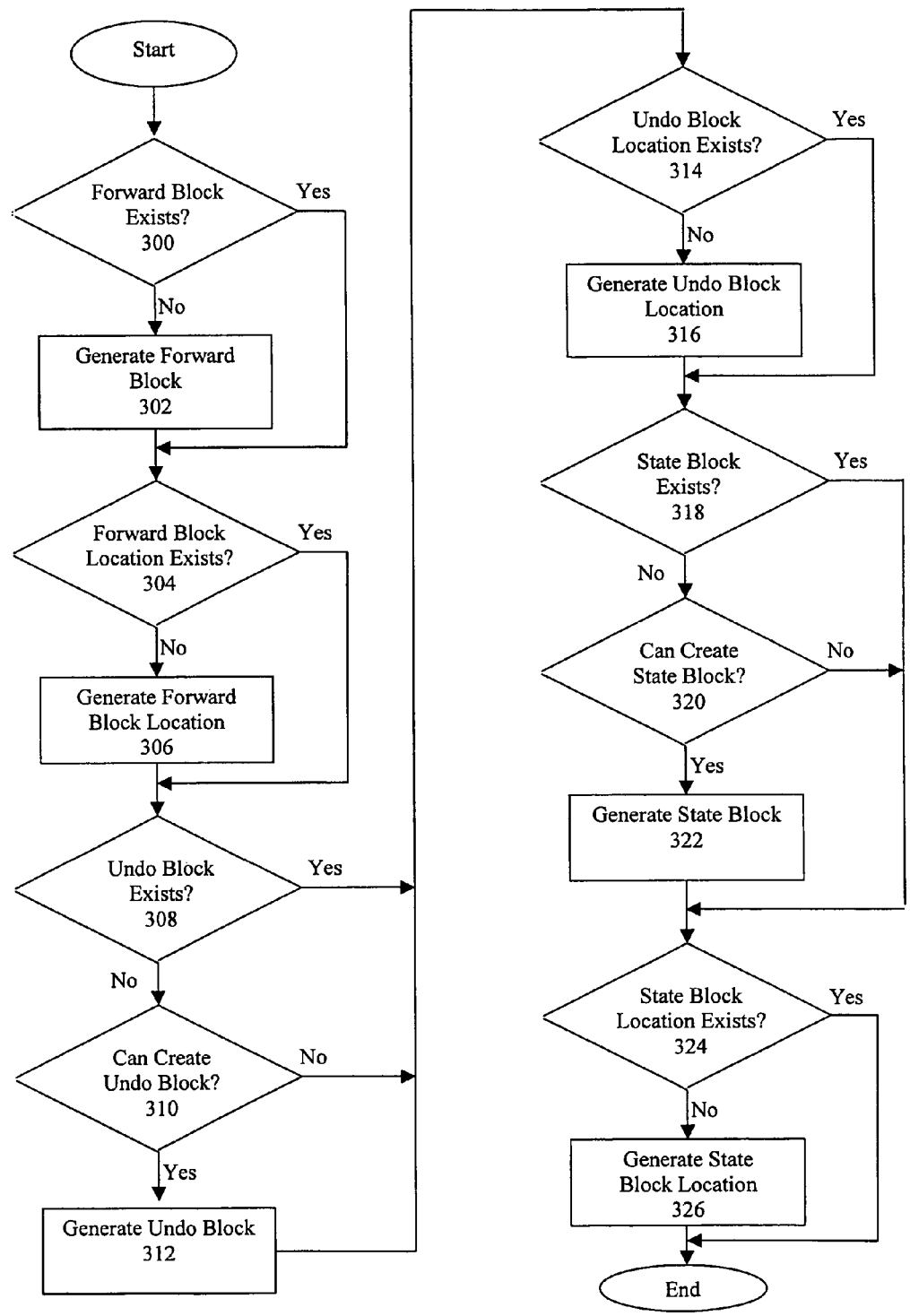
FIG. 3 is a flow chart illustrating a method for generating a block within a recoverable script.

FIG. 3 illustrates a method for generating a block within a recoverable script associated with a recoverable operation, in accordance with an embodiment of the present invention. In generating or executing a one-step operation, the method of FIG. 3 may be performed for each atomic transaction. The method of FIG. 3 may result in a recoverable script that includes a forward block, an undo block, and a state block associated with the atomic transaction. If an error occurs when executing the one-step operation, these blocks may be used to roll forward or roll back. Methods for rolling forward and rolling back will be discussed further with reference to FIGS. 5-6.

The first time a recoverable script is generated for a particular atomic operation, it may be necessary to generate various blocks of code, such as forward blocks, undo blocks, state blocks, location blocks, and the like. However, in the case of a failure, the method of generating a recoverable script for a particular atomic transaction may be performed more than once. In this case, many of the blocks of code may already exist. In this case, it may not be necessary to generated duplicate blocks of code when generating a recoverable script.

As shown in FIG. 3, the method may begin in step 300, wherein it is determined whether a forward block exists. In one implementation, the forward block will be specified by the lower-level API or other atomic transaction, and thus will exist. If the forward block does not yet exist, it may be generated in step 302.

In step 304, it may be determined whether the forward block location exists. The forward block location may specify the database or segment of memory in which the forward block should be executed. For example, if the forward block is executed to copy a subset of data from a first database, then the first database may be the forward block location.

In some cases, the forward block location may be explicitly specified by the forward block, and the forward block location may therefore already exist. In other cases, the forward block may be examined to determine the forward block location. In this case, the forward block location may not yet exist. In still other cases, the recoverable script for the atomic transaction may have previously been generated, and the forward block location for the atomic transaction may have previously been defined, and may therefore exist. If the forward block location does not yet exist for the atomic transaction, the forward block location may be generated in step 306.

In step 308, it may be determined whether an undo block exists for the atomic transaction. The undo block may be executed to reverse the changes made by the forward block. For example, if the forward block is executed to copy a subset of data from a first database to a second database, the undo block may be executed to delete the subset of data from the second database. If the recoverable script for the atomic transaction has previously been generated, the undo block for the atomic operation may exist. In other cases, the undo block may not yet exist.

If the undo block does not yet exist, in step 310, it may be determined whether an undo block can be created. In some cases, the undo block may be created, for example, based on the forward block. In other cases, it may not be possible to generate the undo block at this point. For example, if one or more rules affect the execution of the forward block, the undo block may not be generated until the rules are obtained during the execution of the forward block. If it is possible to generate the undo block, the undo block may be generated in step 312.

In step 314, it may be determined whether an undo block location exists for the atomic transaction. The undo block location may specify the database or segment of memory in which the undo block should be executed. For example, if the undo block is executed to delete a subset of data from the second database, then the second database may be the undo block location.

In some cases, the undo block location may be explicitly specified by the undo block, and the undo block location may therefore already exist. In other cases, the undo block may be examined to determine the undo block location. In this case, the undo block location may not yet exist. In still other cases, the recoverable script for the atomic operation may have previously been generated, and the undo block location for the atomic operation may exist. If the undo block location for the atomic operation does not yet exist, the undo block location may be specified in step 316.

In step 318, it may be determined whether the state block exists for the atomic operation. The state block may be executed to set the states of variables and set other internal states to mimic the successful operation of the forward block. The state block may be used for rolling forward and rolling back changes to the database, as will be described further with reference to FIGS. 5-6.

If the recoverable script for the atomic transaction has previously been generated, the state block for the atomic transaction may exist. In other cases, the state block may not yet exist.

If the state block does not yet exist, in step 320, it may be determined whether the state block can be created. In some cases, the state block may be created, for example, based on the forward block. In other cases, it may not be possible to generate the state block at this point. For example, if one or more rules affect the execution of the forward block, the state block may not be generated until the rules are obtained during the execution of the forward block.

If it is possible to generate the state block, the state block may be generated in step 322.

In step 324, it may be determined whether a state block location exists for the atomic transaction. The state block location may specify the database or segment of memory in which the state block should be executed. For example, if the state block is executed to set variables in a first memory block, then the first memory block may be the state block location.

In some cases, the state block location may be explicitly specified by the state block, and the state block location may therefore already exist. In other cases, the state block location may not yet exist, and the state block may be examined to determine the state block location. In still other cases, the recoverable script for the atomic operation may have previously been generated, and the state block location for the atomic transaction may exist.

If the state block location for the atomic transaction does not yet exist, the state block location may be specified in step 326.

The redo, undo, and state blocks may include references to one or more transaction logs. In one implementation, these references to the transaction logs may constitute the grouping of transaction logs.

Figure 4:
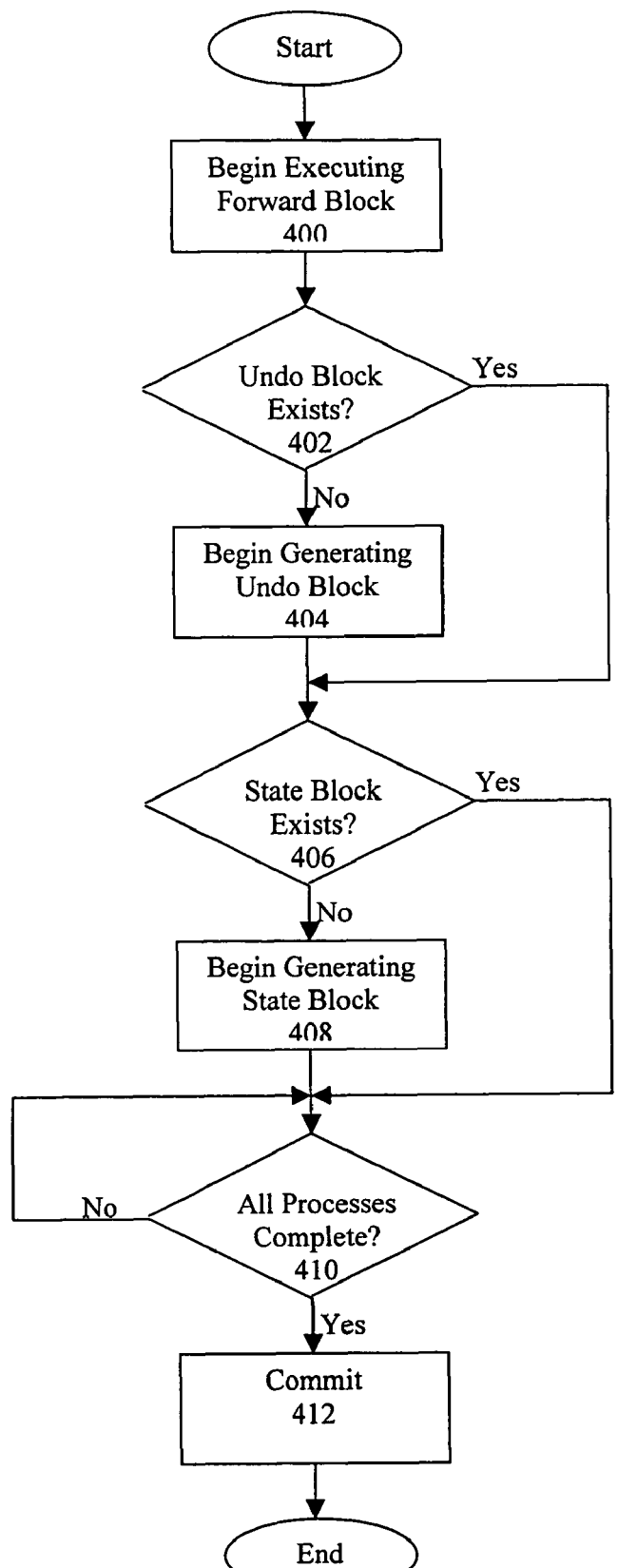
FIG. 4 is a flow chart illustrating a method for executing a block within a recoverable script.

FIG. 4 is a flow chart illustrating a method for executing a block within a recoverable script. A one-step operation may include one or more atomic transactions. In one implementation, the one-step operation may be implemented as a one-step API, and the atomic transactions may be implemented, for example, as lower-level APIs. Prior to execution of the one-step operation, a recoverable script may be generated for each atomic transaction, as discussed with reference to FIG. 3. During the execution of a one-step API, a recoverable script may be executed for each atomic transaction, as illustrated in FIG. 4.

A method for executing a recoverable script may begin in step 400, wherein the forward block may be executed. In step 402, it may be determined whether an undo block exists for the atomic transaction. In some cases, the undo block may already exist, for example, because it has been generated during step 312 of FIG. 3. However, in other cases, it may not be possible to generate the undo block until the execution of the forward block. In this case, the undo block may not yet exist, and in step 404, generation of the undo block may begin.

In step 406, it may be determined whether a state block exists for the atomic transaction. In some cases, the state block may already exist, for example, because it has been generated during step 326 of FIG. 3. However, in other cases, it may not be possible to generate the state block until the execution of the forward block. In this case, the state block may not yet exist, and in step 408, generation of the state block may begin.

In step 410, it may be determined whether all processes are complete. This may include, for example, determining whether execution of the forward block is complete, whether generation of the undo block is complete, and whether generation of the state block is complete. When all processes are complete, the atomic transaction may commit in step 412.

Recovering From Failures

Prior to executing a one-step operation, a recoverable script may be generated for each atomic transaction included in the one-step operation, as shown in FIG. 3. During execution of a one-step operation, a recoverable script may be executed for a set of atomic transactions. This may include executing a plurality of blocks, executing each block according to a method shown in FIG. 4. In the case of a failure in execution of the one-step operation, a user may choose to roll forward or roll back changes to the database. A method for rolling forward changes associated with the one-step operation is illustrated in FIG. 5, and a method for rolling back changes associated with the one-step operation is illustrated in FIG. 6.

Figure 5:
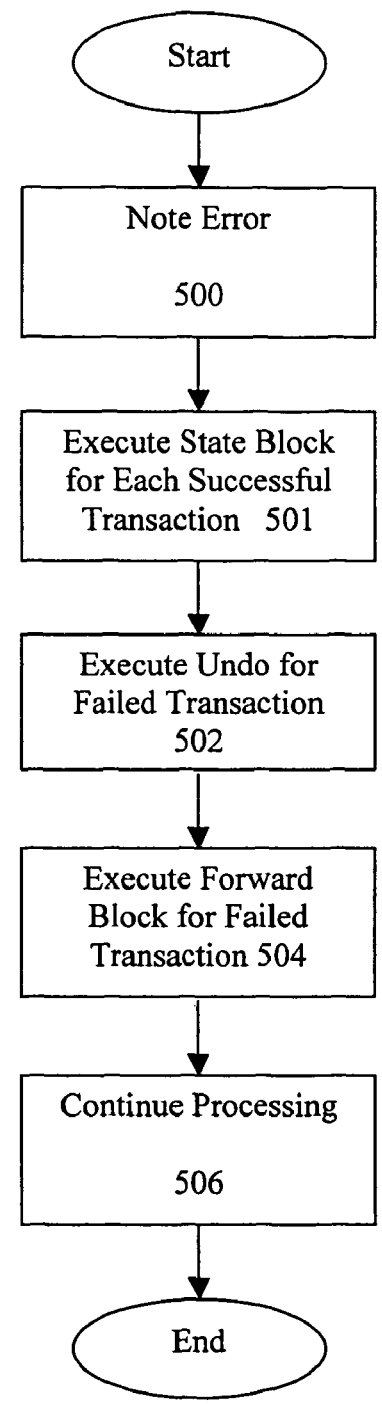
FIG. 5 is a flow chart illustrating a method for rolling forward after a failure.
Figure 6:
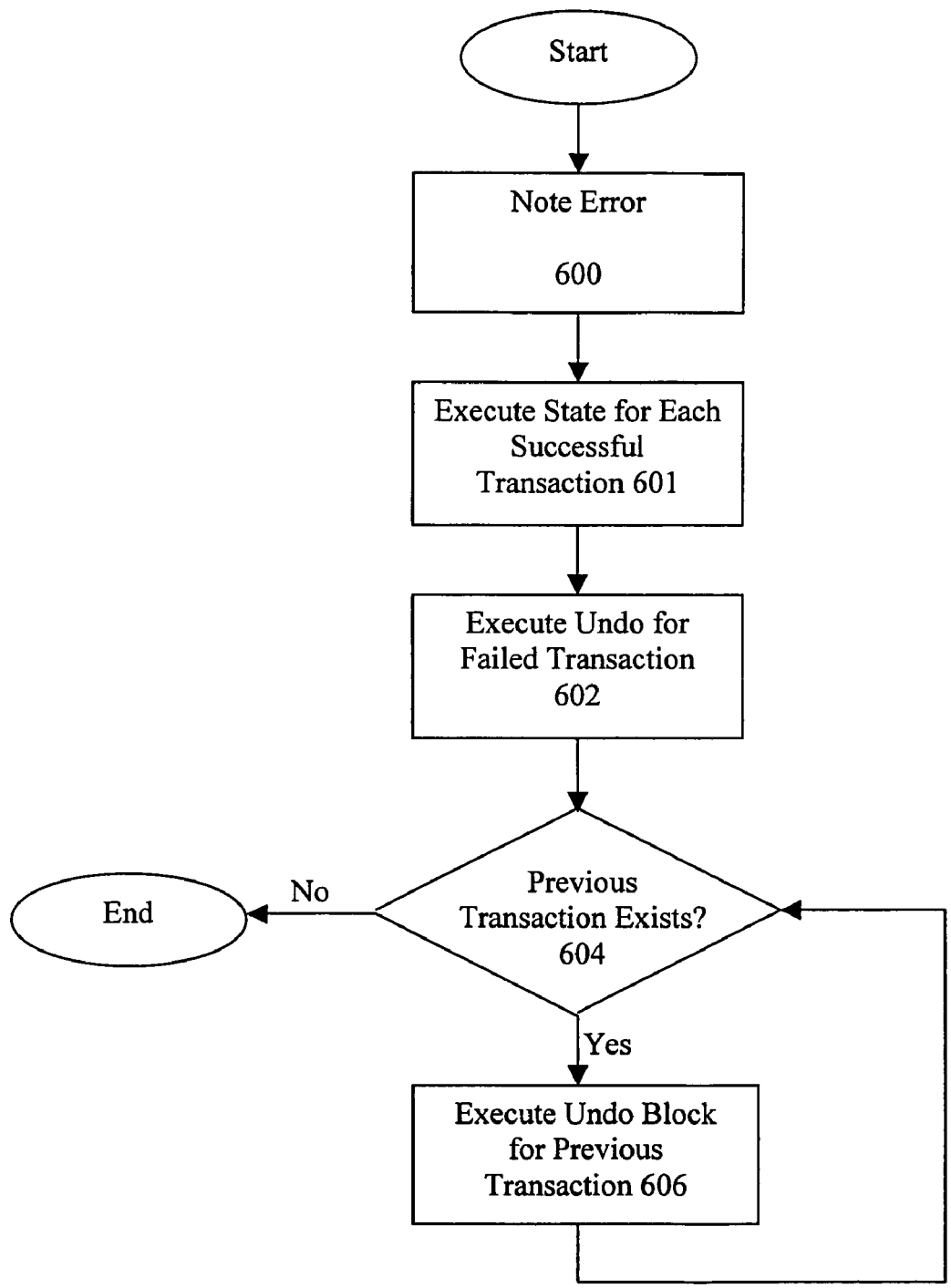
FIG. 6 is a flow chart illustrating a method for rolling back after a failure.

FIG. 5 is a flow chart illustrating a method for rolling forward after a failure. As shown in FIG. 5, the method may begin in step 500, wherein the error causing the failure may be noted, if possible. In some cases, the process may fail before the error can be noted, and the method will begin in step 501.

In step 501, the state blocks for each successful committed transaction may be executed, in the order in which the transactions were executed. Executing the state block for each successfully committed transaction may ensure that all internal states are set to the values they had prior to the execution of the failed transaction. This may ensure that the execution of the undo and forward blocks in steps 502, 504, and 506 proceeds appropriately.

In step 502, the undo block corresponding to the failed atomic transaction may be executed. Executing the undo block for the failed step may reverse any changes that may have been made in the failed step.

In step 504, the forward block for the failed transaction may be executed. In step 506, processing may continue. Processing 506 may include, for example, executing the forward block for any transactions following the failed transaction.

FIG. 6 is a flow chart illustrating a method for rolling back after a failure. As shown in FIG. 6, the method may begin in step 600, wherein the error causing the failure may be noted, if possible. In some cases, the process may fail before the error can be noted, and the method will begin in step 601.

In step 601, the state blocks for each successful committed transaction may be executed, in the order in which the transactions were executed. Executing the state block for each successfully committed transaction may ensure that all internal states are set to the values they had prior to the execution of the failed transaction. This may ensure that the execution of the undo blocks in steps 602, 604, and 606 proceeds appropriately.

In step 602, the undo block corresponding to the failed atomic transaction may be executed. Executing the undo block for the failed step may reverse any changes that may have been made in the failed step.

In steps 604 and 606, undo blocks may be executed for each prior transaction, in reverse order. For example, if a failure occurred during the third atomic transaction, the undo block for the second atomic transaction would be executed, followed by the undo block for the first atomic transaction.

In step 604, it may be determined whether a previous transaction exists. If a previous transaction exists, the undo block for the previous transaction may be executed in step 606. The method may then return to step 604. Rolling back the changes made by each atomic transaction in reverse order may return the databases to their original state.

System Architecture Overview

Figure 7:
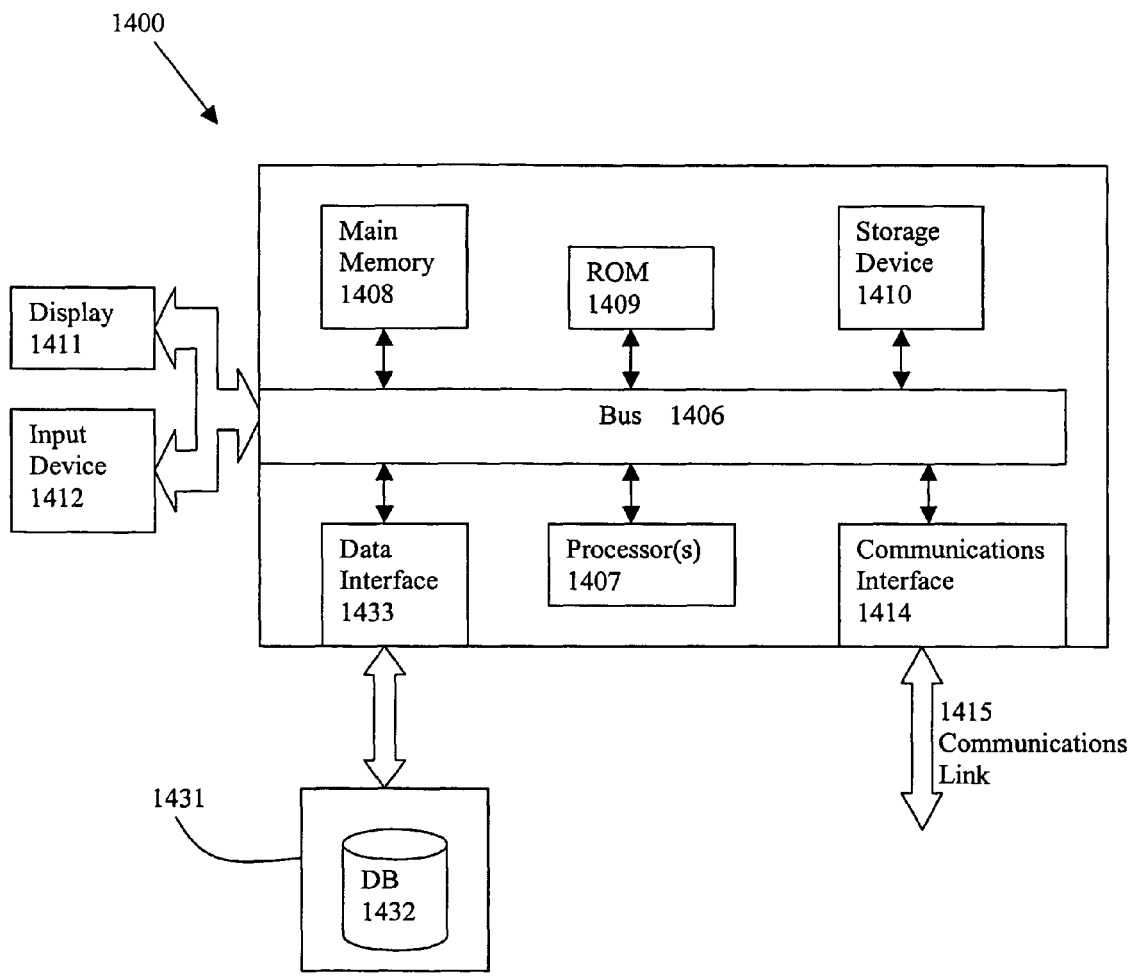
FIG. 7 is a diagram of a computer system with which the present invention can be implemented.

The execution of the sequences of instructions required to practice the invention may be performed in embodiments of the invention by a computer system 1400 as shown in FIG. 7. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 7, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile and volatile media. Non-volatile media, i.e., media that can retain information in the absence of power, includes the ROM 1409, CD ROM, magnetic tape, and magnetic discs. Volatile media, i.e., media that cannot retain information in the absence of power, includes the main memory 1408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer implemented method for creating an operation to perform on data, the method including:

identifying a first atomic database transaction and a second atomic database transaction, wherein the first atomic database transaction is associated with a first set of one or more logs which comprise one or more first entries that are a result of an execution of the first transaction, and the second atomic database transaction is associated with a second set of one or more logs which comprise one or more second entries that are a result of an execution of the second atomic database transaction;

creating the operation by grouping the first atomic database transaction and the second atomic database transaction for the operation to form an atomic transaction group, wherein the act of creating the operation is performed by at least one processor;

grouping the first set and the second set to form a grouping of logs based at least in part upon the atomic transaction group, wherein the action of grouping the first set and the second set to form the grouping of logs comprises:

identifying or generating one or more state blocks of code that is used to set one or more states to mimic the operation; and associating the first set of one or more logs and the second set of one or more logs into the grouping of logs by using at least a first set of references to the first set of one or more logs and a second set of references to the second set of one or more logs, in which the operation comprises the first set of references and the second set of references, and the grouping of logs is atomic in that an execution or application of any entry in the one or more logs in the grouping of logs causes an execution or application of all remaining entries in the one or more logs in the grouping of logs.

2. The method of claim 1, wherein the first set of one or more logs or the second set of one or more logs comprises an undo log or a redo log.

3. The method of claim 1, wherein the act of associating the first set with the second set comprises:
generating a recoverable script including references to the identified transaction logs.

4. The method of claim 3, wherein the recoverable script comprises:
a redo block of code for each of the first atomic database transaction and the second atomic database transaction, the redo block containing a reference to a redo record;
an undo block of code for each of the first atomic database transaction and the second atomic database transaction, the undo block containing a reference to an undo record; and
a state block of code for each successfully committed transaction.

5. The computer implemented method of claim 1, wherein the act of creating the operation is performed by at least grouping the first atomic database transaction and the second atomic database transaction rather than by managing or searching a plurality of transaction logs to identify one or more dependencies for the operation.

6. The computer implemented method of claim 1, wherein the act of creating the operation is performed by at least grouping the first atomic database transaction and the second atomic database transaction rather than by managing or searching a plurality of transaction logs to identify one or more sub-operations for the act of creating the operation.

7. The computer implemented method of claim 1, wherein the first atomic database transaction and the second atomic database transaction are atomic, consistent, isolated, and durable.

8. A computer implemented method for executing an operation on data in a database system, the method comprising:
identifying a first atomic database transaction and a second atomic database transaction, wherein the first atomic database transaction is associated with a first set of one or more logs which comprise one or more first entries that are a result of an execution of the first atomic database transaction, and the second atomic database transaction is associated with a second set of one or more logs which comprise one or more second entries that are a result of an execution of the second atomic database transaction;
grouping the first set and the second set to form a grouping of logs based at least in part upon grouping the first atomic database transaction and the second atomic database transaction into an atomic group of transactions for the operation, wherein
the action of grouping the first set and the second set to form the grouping of logs comprises:
identifying or generating one or more state blocks of code that is used to set one or more states to mimic the operation;
associating the first set of one or more logs and the second set of one or more logs into the grouping of logs by using at least a first set of references to the first set of one or more logs and a second set of references to the second set of one or more logs, in which
the operation comprises the first set of references and the second set of references;
executing the operation by executing at least one forward block, the at least one forward block corresponding to the first or the second atomic database transaction, wherein the act of executing the operation is performed by a processor;
determining whether a failure has occurred during execution; and
the grouping of logs is atomic in that an execution or application of one entry in any of the one or more logs in the grouping of logs causes execution or application of remaining entries in the one or more logs in the grouping of logs.

9. The method of claim 8, wherein executing at least one forward block comprises:
rolling forward one or more changes made by each atomic database transaction.

10. The method of claim 9, wherein the act of rolling forward comprises:
executing an undo block for a failed transaction;
executing a state block for each successfully committed transaction that executed successfully;
executing a forward block for the failed transaction; and
executing a forward block for each subsequent atomic database transaction.

11. The method of claim 8, wherein executing at least one forward block comprises:
rolling back one or more changes made by each atomic database transaction.

12. The method of claim 11, wherein the act of rolling back comprises:
executing an undo block for a failed transaction; and
executing an undo block for each atomic database transaction that executed successfully.

13. The method of claim 8, wherein the operation is used to replicate a subset of data in the database system.

14. The computer implemented method of claim 8, wherein the act of executing the operation is performed by performing the act of grouping the first set and the second set to form a grouping of logs, rather than by managing or searching a plurality of transaction logs to identify one or more sub-operations for the act of executing the operation.

15. A computer implemented method for generating a recoverable script for an operation, the method comprising:
providing a forward block executable to perform a first action;
generating an undo block based on the forward block, the undo block executable to reverse one or more changes made by the forward block;
grouping a first set of one or more logs of the first atomic database transaction and the second set of one or more logs of the second atomic database transaction into an atomic grouping of one or more transaction logs based at least in part upon an action of grouping the first atomic database transaction and the second atomic database transaction to form a one-step operation, wherein
the action of grouping the first set and the second set to form the grouping of logs comprises:
generating a state block of code based on the forward block, the state block executable to set at least one state to mimic execution of the forward block; and
associating the first set of one or more logs and the second set of one or more logs into the grouping of one or more transaction logs by using at least a first number of references to the first set of one or more logs and a second number of references to the second set of one or more logs;
creating the recoverable script for performing the one-step operation on data based at least in part upon the action of grouping the first atomic database transaction and the second atomic database transaction, wherein
the first atomic database transaction is associated with the first set of one or more logs which comprise one or more first entries that are a result of an execution of the first atomic database transaction, and the second atomic database transaction is associated with the second set of one or more logs which comprise one or more second entries that are a result of an execution of the second atomic database transaction;
the recoverable script comprises the first set of references and the second set of references,
the recoverable script comprises the redo block, the undo block, and the state block, and
the atomic grouping of one or more transaction logs is atomic in that an execution or application of one entry in any one of the one or more transaction logs of the atomic grouping causes remaining entries in the atomic groping to be executed.

16. The method of claim 15, further comprising:
for each of the first atomic database transaction and the second atomic database transaction, generating a recoverable script.

17. The computer implemented method of claim 15, wherein the act of performing an operation on the data is performed by performing the act of creating the recoverable script based at least in part upon grouping the first atomic database transaction and the second atomic database transaction into the group of atomic database transactions for the operation, rather than by managing or searching a plurality of transaction logs to identify one or more sub-operations for the act of executing the operation.

18. A computer program product for an Application Program Interface (API), the computer program product comprising a non-transitory computer usable storage medium storing thereupon a computer software program for execution by at least one processor to perform a process for executing an operation for replicating a subset of data in a database system, the process comprising:
identifying a first atomic database transaction and a second atomic database transaction, wherein the first atomic database transaction is associated with a first set of one or more logs which comprise one or more first entries that are a result of an execution of the first atomic database transaction, and the second atomic database transaction is associated with a second set of one or more logs which comprise one or more second entries that are a result of an execution of the second atomic database transaction;
grouping the first set and the second set to form a grouping of logs based at least in part upon creating the operation by grouping the first atomic database transaction and the second atomic database transaction for the operation, wherein
the action of grouping the first set and the second set to form the grouping of logs comprises:
identifying or generating one or more state blocks of code that is used to set one or more states to mimic the operation;
associating the first set of one or more logs and the second set of one or more logs into the grouping of logs by using at least a first set of references to the first set of one or more logs and a second set of references to the second set of one or more logs, in which
the operation comprises the first set of references and the second set of references;
the grouping of logs is atomic in that an execution or application of one entry in any of the one or more logs in the grouping of logs causes execution or application of remaining entries in the one or more logs in the grouping of logs;
performing, by using the at least the processor, at least one atomic database transaction selected from a list comprising:
executing a first atomic database transaction from the group of atomic database transactions for initiating a streams queue,
executing a second atomic database transaction from the group of atomic database transactions for initiating a propagation process,
executing a third atomic database transaction from the group of atomic database transactions for specifying one or more propagation rules,
executing a fourth atomic database transaction from the group of atomic database transactions for initiating a capture process,
executing a fifth atomic database transaction from the group of atomic database transactions for specifying one or more capture rules,
executing a sixth atomic database transaction from the group of atomic database transactions for initiating an apply queue,
executing a seventh atomic database transaction from the group of atomic database transactions for initiating an apply process,
executing an eighth atomic database transaction from the group of atomic database transactions for specifying one or more apply rules,
executing a ninth atomic database transaction from the group of atomic database transactions for capturing and propagating redo records, and
executing a tenth atomic database transaction from the group of atomic database transactions for applying changes to a database; and
upon execution the grouping of transaction logs, storing execution results in a computer readable storage medium or display the execution results on a display apparatus.

19. The computer program product for the API of claim 18 further comprises:
executing a forward block corresponding to the first atomic database transaction or the second atomic database transaction.

20. The computer program product for the API of claim 18, wherein the API is capable of rolling forward in the event of a failure.

21. The computer program product for the API of claim 20, wherein the act of rolling forward comprises:
executing an undo block for a failed database transaction;
executing a state block for each atomic database transaction that executed successfully;
executing a forward block for the failed atomic database transaction; and
executing a forward block for each subsequent atomic database transaction.

22. The computer program product for the API of claim 18, wherein the API is capable of rolling back in the event of a failure.

23. The computer program product for the API of claim 22, wherein rolling back comprises:
executing an undo block for a failed atomic database transaction; and executing an undo block for each atomic database transaction that executed successfully.

24. A computer program product comprising a volatile or non-volatile computer usable storage medium having executable code to execute a process for executing an operation on data in a database system, the process comprising:
identifying a first atomic database transaction and a second atomic database transaction, wherein the first atomic database transaction is associated with a first set of one or more logs which comprise one or more first entries that are a result of an execution of the first atomic database transaction, and the second atomic database transaction is associated with a second set of one or more logs which comprise one or more second entries that are a result of an execution of the second atomic database transaction;
grouping the first set and the second set to form a grouping of logs based at least in part upon creating the operation by grouping the first atomic database transaction and the second atomic database transaction into an atomic group of database transactions for the operation, wherein
the action of grouping the first set and the second set to form the grouping of logs comprises:
identifying or generating one or more state blocks of code that is used to set one or more states to mimic the operation;
associating the first set of one or more logs and the second set of one or more logs into the grouping of logs by using at least a first set of references to the first set of one or more logs and a second set of references to the second set of one or more logs, in which
the operation comprises the first set of references and the second set of references;
executing the operation by executing at least one forward block, each forward block corresponding to an atomic database transaction, wherein the act of executing the operation is performed by a processor;
determining whether a failure has occurred during execution; and
the grouping of logs is atomic in that an execution or application of one entry in any of the one or more logs in the grouping of logs causes execution or application of remaining entries in the one or more logs in the grouping of logs.

25. The computer program product of claim 24, wherein the act of executing at least one block for each atomic database transaction comprises:
rolling back the changes made by each atomic database transaction.

26. The computer program product of claim 24, wherein the operation is used to replicate a subset of data in the database system.

27. A system for executing an operation associated with a series of atomic database transactions, comprising:
one or more processors configured for performing a process comprising:
identifying a first atomic database transaction and a second atomic database transaction, wherein the first atomic database transaction is associated with a first set of one or more logs which comprise one or more first entries that are a result of an execution of the first atomic database transaction, and the second atomic database transaction is associated with a second set of one or more logs which comprise one or more second entries that are a result of an execution of the second atomic database transaction;
grouping the first set and the second set to form a grouping of logs based at least in part upon creating the operation by grouping the first atomic database transaction and the second atomic database transaction into an atomic group of database transactions for the operation, wherein;
the action of grouping the first set and the second set to form the grouping of logs comprises:
identifying or generating one or more state blocks of code that is used to set one or more states to mimic the operation;
associating the first set of one or more logs and the second set of one or more logs into the grouping of logs by using at least a first set of references to the first set of one or more logs and a second set of references to the second set of one or more logs, in which
the operation comprises the first set of references and the second set of references;
executing the operation by executing at least one forward block, each forward block corresponding to an atomic database transaction, wherein the act of executing the operation is performed by a processor;
determining whether a failure has occurred during execution; and
the grouping of logs is atomic in that an execution or application of one entry in any of the one or more logs in the grouping of logs causes execution or application of remaining entries in the one or more logs in the grouping of logs.

28. The system of claim 27, wherein the act of executing at least one block for each atomic database transaction comprises:
rolling back the changes made by each atomic database transaction.

29. The system of claim 27, wherein the operation is used to replicate a subset of data in the database system.

30. A computer program product comprising a volatile or non-volatile computer usable storage medium having a sequence of instructions which, when executed by a processor, cause the processor to execute a process for creating an operation on data in a database system, the process comprising:
identifying a first atomic database transaction and a second atomic database transaction, wherein the first atomic database transaction is associated with a first set of one or more logs which comprise one or more first entries that are a result of an execution of the first atomic database transaction, and the second atomic database transaction is associated with a second set of one or more logs which comprise one or more second entries that are a result of an execution of the second atomic database transaction;
creating the operation by grouping the first atomic database transaction and the second atomic database transaction for the operation to form a transaction group, wherein the act of creating the operation is performed by a processor;
grouping the first set and the second set to form a grouping of logs based at least in part upon the transaction group, wherein
the action of grouping the first set and the second set to form a grouping of logs comprises:
identifying or generating one or more state blocks of code that is used to set one or more states to mimic the operation;

associating the first set of one or more logs and the second set of one or more logs into the grouping of logs by using at least a first set of references to the first set of one or more logs and a second set of references to the second set of one or more logs, in which the operation comprises the first set of references and the second set of references, and the grouping of logs is atomic in that an execution or application of any entry in the one or more logs in the grouping of logs causes an execution or application of all remaining entries in the one or more logs in the grouping of logs.

31. A system for creating an operation on data in a database system, comprising:

means for identifying a first atomic database transaction and a second atomic database transaction, wherein the first atomic database transaction is associated with a first set of one or more logs which comprise one or more first entries that are a result of an execution of the first atomic database transaction, and the second atomic database transaction is associated with a second set of one or more logs which comprise one or more second entries that are a result of an execution of the second atomic database transaction;

a processor configured for creating the operation by grouping the first atomic database transaction and the second atomic database transaction for the operation to form a transaction group;

means for grouping the first set and the second set to form a grouping of logs based at least in part upon the transaction group, wherein the means for grouping the first set and the second set to form the grouping of logs comprises:

means for identifying or generating one or more state blocks of code that is used to set one or more states to mimic the operation; and means for associating the first set of one or more logs and the second set of one or more logs into the grouping of logs by using at least a first set of references to the first set of one or more logs and a second set of references to the second set of one or more logs, in which the operation comprises the first set of references and the second set of references, and the grouping of logs is atomic in that an execution or application of any entry in the one or more logs in the grouping of logs causes an execution or application of all remaining entries in the one or more logs in the grouping of logs.

\* \* \* \* \*

UNITED STATES PATENT AND TRADEMARK OFFICE
CERTIFICATE OF CORRECTION

PATENT NO. : 8,078,588 B2
APPLICATION NO. : 11/247973
DATED : December 13, 2011
INVENTOR(S) : Lakshminath et al.

It is certified that error appears in the above-identified patent and that said Letters Patent is hereby corrected as shown below:

On Title page 2, Item (56) in column 1, under "Other Publications", line 43, delete "Internatinal" and insert -- International --, therefor.

On Title page 2, Item (56) in column 1, under "Other Publications", line 65, delete "SIBMOD" and insert -- SIGMOD --, therefor.

On Title page 2, Item (56) in column 2, under "Other Publications", line 22, delete "of" and insert -- on --, therefor.

On Title page 2, Item (56) in column 2, under "Other Publications", line 53, delete "Weihi," and insert -- Weihl, --, therefor.

In column 16, line 40, in Claim 18, delete "execution" and insert -- executing --, therefor.

Signed and Sealed this
Thirteenth Day of March, 2012

David J. Kappos
*Director of the United States Patent and Trademark Office*